US000002014H

(19) United States

(12) Statutory Invention Registration

Boulos et al.

(10) Reg. No.: US H2014 H

(43) Published: Feb. 5, 2002

(54) PROCESS AND COMPOSITION FOR FORMING AN ADHERENT PAINT OR VITREOUS ENAMEL COATING ON STEEL

(75) Inventors: Mervet S. Boulos, Troy; Bruce F. Caswell, Dearborn, both of MI (US)

(73) Assignee: Henkel Corporation, Gulph Mills, PA (US)

(21) Appl. No.: 09/553,104

(22) Filed: Apr. 20, 2000

Related U.S. Application Data

(60) Provisional application No. 60/130,100, filed on Apr. 20, 1999.

(51) Int. Cl.[7] ..... B05D 3/02

(52) U.S. Cl. ..... 427/372.2; 427/397.7; 427/376.1; 427/376.2

*Primary Examiner*—Michael J. Carone
*Assistant Examiner*—Aileen J. Baker
(74) *Attorney, Agent, or Firm*—Wayne C. Jaeschke; Stephen D. Harper; Norvell E. Wisdom, Jr.

(57) ABSTRACT

Excellent adhesion of vitreous enamel to steel can be achieved via an intermediate layer formed on the steel by bringing it into contact with a liquid composition that contains water and a component of solute selected from the group consisting of dissolved silicates and dissolved borates and, optionally, surfactant. The modification of the steel surface achieved by treating it with silicates and/or borates is also effective for improving the adhesion of steel to other protective type coatings such as paint.

20 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS AND COMPOSITION FOR FORMING AN ADHERENT PAINT OR VITREOUS ENAMEL COATING ON STEEL

CROSS-REFERENCE TO RELATED APPLICATIONS

Priority for this application is claimed under 35 U.S.C. 119(e)(1) from application Ser. No. 60/130,100 filed Apr. 20, 1999.

BACKGROUND OF THE INVENTION

Steel is an important structural material, but unless covered with a protective coating, it is notoriously prone to rusting and other types of corrosion, even from contact with the ambient natural atmosphere and more rapidly from many other types of environments to which articles made of steel are likely to be exposed. Accordingly, steel articles are commonly protected from corrosion by providing them with some kind of protective coating, such as paint.

One of the most durable and effective protective coatings for steel is vitreous enamel, which is alternatively called "porcelain enamel" or simply "enamel". Ordinarily, such enamel, like most other protective coatings, will not bond effectively to clean steel, so that an intermediate layer is needed in order to obtain an enamel coating with good adhesion and durability. A thin layer of nickel or zinc has been generally used in the prior art as an intermediate bonding layer for vitreous enamel. This is relatively costly in process time, chemicals, and/or equipment and often does not provide as good adhesion as would be desirable. Accordingly, a major object of this invention is to provide a process for forming a high quality corrosion-protective coating, particularly a vitreous enamel coating, on a steel substrate, said process not requiring any use of an intermediate metallic layer between the steel and the protective coating and achieving at least one of the following benefits over the prior art processes utilizing a metallic intermediate layer: lower materials cost; reduced process time; reduced requirements for energy input into the process; lower cost capital equipment requirements for the process; better adhesion of the protective coating to the steel substrate, especially under moderate flexural forces; and better resistance of the protective surface formed to corrosion or other damage from environments with which it comes into contact. An alternative object is to provide novel compositions that are advantageously used in a process according to the invention.

Except in the claims and the operating examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred, however. Also, throughout the description, unless expressly stated to the contrary: percent, "parts of", and ratio values are by weight or mass; the term "polymer" includes "oligomer", "copolymer", "terpolymer" and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description or of generation in situ within the composition by chemical reaction(s) noted in the specification between one or more newly added constituents and one or more constituents already present in the composition when the other constituents are added, and does not preclude unspecified chemical interactions among the constituents of a mixture once mixed; specification of constituents in ionic form additionally implies the presence of sufficient counterions to produce electrical neutrality for the composition as a whole and for any substance added to the composition; any counterions thus implicitly specified preferably are selected from among other constituents explicitly specified in ionic form, to the extent possible; otherwise such counterions may be freely selected, except for avoiding counterions that act adversely to an object of the invention; the word "mole" means "gram mole", and the word itself and all of its grammatical variations may be used for any chemical species defined by all of the types and numbers of atoms present in it, irrespective of whether the species is ionic, neutral, unstable, hypothetical, or in fact a stable neutral substance with well defined molecules; the terms "solution", "soluble", "homogeneous", and the like are to be understood as including not only true equilibrium solutions or homogeneity but also dispersions that show no visually detectable tendency toward phase separation over a period of observation of at least 100, or preferably at least 1000, hours during which the material is mechanically undisturbed and the temperature of the material is maintained within the range of 18–25° C.; the first definition of an acronym or other abbreviation applies to all subsequent uses of the same acronym or other abbreviation; and the term "paint" and its grammatical variations includes all similar types of coatings that may be described by more specialized names such as "lacquer", "varnish", "primer coat", "top coat", or the like.

BRIEF SUMMARY OF THE INVENTION

It has surprisingly been found that an excellent adhesion of vitreous enamel to steel can be achieved via an intermediate layer formed on the steel by bringing it into contact with a liquid composition that contains water and a component of solute selected from the group consisting of dissolved silicates and dissolved borates and, optionally, surfactant. The modification of the steel surface achieved by treating it with silicates and/or borates is also effective for improving the adhesion of steel to other protective type coatings such as paint.

DETAILED DESCRIPTION OF THE INVENTION AND PREFERRED EMBODIMENTS

A process according to the invention comprises at least the following operations:

(I) bringing a clean steel substrate surface into contact with a liquid treating composition that comprises a component of solute selected from the group consisting of silicate anions and borate anions and, optionally and preferably, a component of organic surfactant molecules, and maintaining said substrate surface in contact with said liquid treating composition for a liquid treating interval of time;

(II) separating said substrate surface as treated during operation (I) from the bulk of said liquid treating composition with which it was maintained in contact during operation (I) and, preferably without any intermediate rinsing, heating said substrate surface, together with any amount of said liquid treating composition that remains adhered to its surface, to a minimum heat treating temperature and maintaining said substrate at or above said minimum heat treating temperature for a heat treating interval of time that is sufficient to dry said substrate; and (III) bonding a protective outer coating to the surface of the dried substrate from operation (II).

The clean steel substrate surface treated in operation (I) as described above preferably has been previously cleaned with a conventional alkaline cleaner as known in the art for preparation of steel surfaces for subsequent chemical treatments.

Preferably the protective coating bonded to the dried surface in operation (III) as described above is a vitreous enamel coating and is conventional in itself as already known in the enameling art. At least when it is, all of the other preferences stated hereinbelow also apply as stated.

The liquid treating composition used in operation (I) of a process according to the invention as described above preferably has a pH value that is at least, with increasing preference in the order given, 6, 8, 9.0, 9.5, 10.0, 10.5, 11.0, 11.5, or 11.8, and independently preferably is not more than, with increasing preference in the order given, 14.0, 13.5, 13.3, 13.1, 12.9, 12.7, 12.5, 12.3, or 12.1.

The source of silicate anion component (A) preferably is at least one alkali metal silicate that is adequately soluble in water. More preferably sodium silicates are utilized as the source, still more preferably sodium metasilicates, and most preferably sodium metasilicate pentahydrate. Independently, in a working composition according to the invention, the concentration of silicate anions, measured as their stoichiometric equivalent as $Na_2SiO_3 \cdot 5H_2O$, with the stoichiometry being based on equivalent numbers of silicon atoms, is at least, with increasing preference in the order given, 11, 13, 15, 17, or 19 grams of $Na_2SiO_3 \cdot 5H_2O$ per liter of total liquid composition, this unit of concentration being hereinafter freely applied to any other constituent as well as to $Na_2SiO_3 \cdot 5H_2O$ and being hereinafter usually abbreviated as "g/l". Independently, at least for economy, the concentration of $Na_2SiO_3 \cdot 5H_2O$ in a working composition according to the invention preferably is not more than, with increasing preference in the order given, 100, 75, 50, 40, 35, 30, 28, 26, 24, or 22 g/l.

A wide variety of surfactants can be used for optional and preferred component (B) of the treating liquid. Two particularly preferred classes are anionic surfactants that are salts of partial esters of inorganic acids, preferably phosphoric acid, and nonionic surfactants that are ethoxylates of fatty alcohols, optionally modified in some manner such as by substitution of a chloro or other halo moiety for the terminal —OH moiety. If anionic surfactant(s) is/are used as the only surfactant(s), the concentration of anionic surfactant in a working composition according to the invention preferably is at least, with increasing preference in the order given, 0.008, 0.015, 0.030, 0.040, 0.050, 0.060, 0.070, 0.075, 0.080, or 0.085 g/l and independently, at least for economy, preferably is not more than, with increasing preference in the order given, 1.0, 0.8, 0.6, 0.4, 0.20, 0.15, or 0.10 g/l. If only nonionic surfactant(s) is/are used, the nonionic surfactant concentration in a working composition preferably is at least, with increasing preference in the order given, 0.04, 0.08, 0.15, 0.20, 0.25, 0.30, 0.34, or 0.37 g/l and independently preferably, at least for economy, is not more than 3.0, 2.5, 2.0, 1.5, 1.0, 0.8, 0.6, or 0.4 g/l.

Irrespective of their absolute values: when anionic surfactant is present in a working and/or concentrate composition according to the invention, the ratio of the mass of anionic surfactant to the mass, in the same working and/or concentrate composition according to the invention, of silicate anions, measured as their stoichiometric equivalent as $Na_2SiO_3 \cdot 5H_2O$, with the stoichiometry being based on equivalent numbers of silicon atoms, preferably is at least, with increasing preference in the order given, 0.0010:1.00, 0.0020:1.00, 0.0030:1.00, 0.0035:1.00, or 0.0040:1.00 and independently, primarily for economy, preferably is not more than, with increasing preference in the order given, 0.5:1.00, 0.3:1.00, 0.10:1.00, 0.05:1.00, 0.040:1.00, 0.030:1.00, 0.020:1.00, 0.016:1.00, 0.012:1.00, 0.010:1.00, 0.0080:1.00, 0.0070:1.00, 0.0060:1.00, 0.0055:1.00, 0.0050:1.00, 0.0045:1.00, or 0.0042:1.00; and when nonionic surfactant is present in a working and/or concentrate composition according to the invention, the ratio of the mass of nonionic surfactant to the mass, in the same working and/or concentrate composition according to the invention, of silicate anions, measured as their stoichiometric equivalent as $Na_2SiO_3 \cdot 5H_2O$, with the stoichiometry being based on equivalent numbers of silicon atoms, preferably is at least, with increasing preference in the order given, 0.0040:1.00, 0.0060:1.00, 0.0080:1.00, 0.010:1.00, 0.012:1.00, 0.014:1.00, 0.016:1.00, or 0.018:1.00 and independently, primarily for economy, preferably is not more than, with increasing preference in the order given, 0.50:1.00, 0.40:1.00, 0.30:1.00, 0.20:1.00, 0.15:1.00, 0.100:1.00, 0.075:1.00, 0.050:1.00, 0.035:1.00, 0.030:1.00, 0.027:1.00, 0.024:1.00, 0.022:1.00, or 0.020:1.00.

The liquid treating composition used in operation (I) of a process according to the invention as described above preferably contains little or none of various materials, including some that have often been used in other types of metal treating for corrosion resistance and/or other purposes. More particularly, independently for each preferably minimized constituent noted, a liquid treating composition used in operation (I) of a process according to the invention as described above preferably contains not more than, with increasing preference in the order given, 5.0, 1.0, 0.5, 0.2, 0.08, 0.05, 0.02, 0.008, 0.005, 0.002, 0.0008, 0.0005, 0.0002, 0.00008, 0.00005, or 0.00002% of any of the following: phosphate and condensed phosphate anions; any of the metals nickel, cobalt, chromium, titanium, zirconium, vanadium, molybdenum, tungsten, silver, or copper in any soluble chemical form; any peroxy compound or peroxide; ozone; any simple or complex halide anions; and any nitrogen oxide or oxyanion of nitrogen and oxygen, all except to whatever extent such materials may be part of any necessary or optional component of the liquid treating composition as explicitly recited herein and/or may be constituents of normal tap water supplies.

At least for convenience, the liquid treatment composition used in operation (I) as described above preferably is used at whatever temperature is maintained in the air space surrounding it, provided that this value is within the normal human comfort range of about 18 to 25° C.

No particularly careful control of the amount of liquid treatment composition remaining on the substrate surface is required. Fully satisfactory results, at least on simply shaped substrates, may be readily obtained by immersion of the substrate in a volume of contained liquid treatment composition for at least, with increasing preference in the order given, 0.5, 1.0, 2.0, 4, 8 15, 20, or 30 seconds, then removing and allowing the liquid to drain off under the influence of natural gravity for 2 to 45 seconds, or preferably from 5 to 15 seconds, before moving the substrate to a heating zone. Alternatively, the substrate can be sprayed for about the same length of time as noted for immersion and then allowed to drain for a similar time after spraying is discontinued. Numerous other satisfactory methods of establishing contact between the liquid and the substrate being treated and of separating the substrate from the bulk of the treating liquid will also be apparent to those skilled in the art. The treatment time may be extended up to at least an hour without significant negative effect on the quality of the coating eventually achieved. However, for processing economy, the time of treatment preferably is not more than, with increasing preference in the order given, 20, 10, 5, or 3 minutes.

The first heat treating temperature used in operation (II) as described above preferably is at least, with increasing preference in the order given, 120, 130, 140, 150, 160, 165, 170, 175, 180, or 185° C. and independently preferably is not more than, with increasing preference in the order given, 300, 260, 250, 245, 240, 235, or 230° C. Normally for convenience the temperature is maintained approximately constant during the entire heat treatment time interval, but this is certainly not a requirement of the invention. The heat treatment interval preferably is at least, with increasing preference in the order given, 3, 5, 7, 9, 11, 13, or 15 minutes and independently preferably is not more than, with increasing preference in the order given, 60, 50, 40, 30, 25, or 20 minutes.

Operation (III) as described above in a process according to the invention preferably is performed in whatever manner is best suited to the particular protective coating material applied, as known in itself from the prior art.

Two additional embodiments of the invention are a liquid and a solid concentrate from which a liquid treating composition as needed for use in operation (I) of the process according to the invention as described above may be prepared by dissolving the concentrates in water. A solid concentrate preferably comprises, more preferably consists essentially of, or still more preferably consists of solid, readily soluble, silicate and/or borate salts of an alkali metal, preferably sodium and a solid, readily soluble nonionic surface active agent. Independently, such a solid concentrate preferably contains its surfactant as at least, with increasing preference in the order given, 0.3, 0.5, 0.7, 0.9, 1.1, 1.3, 1.5, 1.7, or 1.9 weight percent of the total solid concentrate. A liquid concentrate preferably comprises, more preferably consists essentially of, or still more preferably consists of: water; a dissolved alkali metal silicate salt in a concentration that is at least, with increasing preference in the order given, 5, 10, 12, 14, 16, 18, 20, 22, or 24% of the total concentrate and independently preferably is not more than, with increasing preference in the order given, 60, 50, 45, or 40% of the total concentrate; and surfactant molecules that are alkali metal salts of partial esters of phosphoric acid with fatty alcohols in a concentration that is at least, with increasing preference in the order given, 0.01, 0.03, 0.05, 0.07, or 0.09% of the total concentrate and independently preferably is not more than, with increasing preference in the order given, 1.0, 0.8, 0.6, 0.4, or 0.2% of the total concentrate.

The practice of the invention may be further appreciated from the following examples, which do not limit the invention.

CONCENTRATES

Two liquid concentrates were made. One was a solution of 25% of $Na_2SiO_3 \cdot 5H_2O$ only in tap water, and the second was a solution in tap water of 25% of $Na_2SiO_3 \cdot 5H_2O$ and of 0.2% of TRITON® H-66 surfactant, which is a commercial product reported by its supplier to be a 50% solution in water of potassium salts of partial esters of phosphoric acid with fatty alcohols. One solid concentrate was made by combining 98 parts of solid $Na_2SiO_3 \cdot 5H_2O$ with 2 parts of ANTAROX® LF-330, which is a commercial product reported by its supplier to have a concentration of 95% of its active ingredients, which are modified ethoxylated fatty alcohol molecules.

WORKING COMPOSITIONS AND PROCESSES

Working liquid treatment compositions were made by dissolving 8% by volume of each of the above-noted liquid concentrates in tap water and by dissolving 2% by weight of the above-noted solid concentrate in water. Conventional cold-rolled steel test panels were cleaned according to a PARCO® CLEANER 319 process as commercially available from Henkel Surface Technologies Division of Henkel Corporation, Madison Heights, Mich. and were then immersed in each of these working compositions for from 0.5 to 3 minutes, removed from the container in which the working compositions had been held while the test panels were in them, allowed to drain for 5 to 15 seconds, then hung in an oven maintained at 90–120° C. for 5 to 15 minutes, after which time their surfaces were completely dry. The surfaces were inspected for rust, but none was visible. The thus prepared surfaces were coated with the solid precursors of a conventional vitreous enamel used on home appliances and processed to convert the precursors into a solid continuous enamel coating, which has excellent adhesion to the steel substrates.

The invention claimed is:

1. A process for providing a steel substrate with an adherent solid protective coating, said process comprising operations of:

(I) bringing a clean steel substrate surface into contact with a liquid treating composition that comprises a component of solute selected from the group consisting of silicate anions and borate anions and maintaining said substrate surface in contact with said liquid treating composition for a liquid treating interval of time;

(II) separating said substrate surface as treated during operation (I) from the bulk of said liquid treating composition with which it was maintained in contact during operation (I) and heating said substrate surface, together with any amount of said liquid treating composition that remains adhered to its surface, to a minimum heat treating temperature and maintaining said substrate at or above said minimum heat treating temperature for a heat treating interval of time that is sufficient to dry said substrate; and (III) bonding a protective coating to the surface of the dried substrate from operation (II).

2. A process according to claim 1, wherein said liquid treating composition comprises:

(A) a concentration of silicate anions that is stoichiometrically equivalent, the stoichiometry being based on equal numbers of silicon atoms, to a concentration of sodium silicate pentahydrate that is from about 11 to about 100 g/l; and (B) at least one of:

a concentration of anionic surfactant that is at least about 0.008 g/l; and a concentration of nonionic surfactant that is at least about 0.04 g/l.

3. A process according to claim 2, wherein said liquid treating composition comprises:

(A) a concentration of silicate anions that is stoichiometrically equivalent, the stoichiometry being based on equal numbers of silicon atoms, to a concentration of sodium silicate pentahydrate that is from about 13 to about 50 g/l; and (B) at least one of:

a concentration of anionic surfactant that is at least about 0.030 g/l, said anionic surfactant being constituted of molecules that are partial esters of at least one inorganic acid; and a concentration of ethoxylated alcohol nonionic surfactant that is at least about 0.15g/l.

4. A process according to claim 3, wherein said liquid treating composition comprises:

(A) a concentration of sodium silicate pentahydrate that is from about 15 to about 30 g/l; and (B) at least one of:

a concentration of partial esters of phosphoric acid surfactant that is at least about 0.060 g/l; and a concentration of ethoxylated alcohol nonionic surfactant that is at least about 0.30 g/l.

5. A process according to claim 1, wherein said liquid treating composition has been made by mixing with a first mass of water at least the following additional masses:

(A) a second mass of silicate anions that is stoichiometrically equivalent, the stoichiometry being based on equal numbers of silicon atoms, to a mass of sodium silicate pentahydrate that constitutes from about 11 to about 100 g/l of said liquid treating composition; and (B) at least one of:

a third mass of anionic surfactant that constitutes at least about 0.008 g/l of said liquid treating composition; and a fourth mass of nonionic surfactant that constitutes at least about 0.04 g/l of said liquid treating composition.

6. A process according to claim 5, wherein said liquid treating composition has been made by mixing with a first mass of water at least the following additional masses:

(A) a second mass of water soluble sodium silicate that is stoichiometrically equivalent, the stoichiometry being based on equal numbers of silicon atoms, to a mass of sodium silicate pentahydrate that constitutes from about 13 to about 50 g/l of said liquid treating composition; and (B) at least one of:

a third mass of anionic surfactant, the molecules of which are partial esters of inorganic acids, that constitutes at least about 0.030 g/l of said liquid treating composition; and a fourth mass of ethoxylated alcohol nonionic surfactant that constitutes at least about 0.15 g/l of said liquid treating composition.

7. A process according to claim 6, wherein:

said second mass comprises an amount of sodium silicate pentahydrate that constitutes from about 15 to about 30 g/l of said liquid treating composition; and either:

said third mass is present in the liquid treating composition and comprises surfactant molecules that are partial esters of phosphoric acid in an amount that constitutes at least about 0.060 g/l of said liquid treating composition; or said fourth mass is present in the liquid treating composition and comprises ethoxylated alcohol nonionic surfactant molecules that constitute at least about 0.30 g/l of said liquid treating composition.

8. A process according to claim 7, wherein:

the steel substrate in operation (I) has been cleaned with an alkaline cleaner before being brought into contact with the liquid treatment composition;

the substrate remains in contact with the liquid treating composition for at least 20 seconds during operation (I);

at the beginning of operation (II), the liquid treating composition is allowed to drain under the influence of natural gravity for from 5 to 15 seconds before the substrate is heated;

said minimum heat treating temperature in operation (II) is from about 180 to about 235° C.; and said heat treating interval of time is from about 11 to about 25 minutes.

9. A process according to claim 6, wherein:

the substrate remains in contact with the liquid treating composition for at least 15 seconds during operation (I);

at the beginning of operation (II), the liquid treating composition is allowed to drain under the influence of natural gravity for from 2 to 45 seconds before the substrate is heated;

said minimum heat treating temperature in operation (II) is from about 170 to about 245° C.; and said heat treating interval of time is from about 7 to about 30 minutes.

10. A process according to claim 5, wherein:

the substrate remains in contact with the liquid treating composition for at least 8 seconds during operation (I);

at the beginning of operation (II), the liquid treating composition is allowed to drain under the influence of natural gravity for from 2 to 45 seconds before the substrate is heated;

said minimum heat treating temperature in operation (II) is from about 150 to about 245° C.; and said heat treating interval of time is at least about 5 minutes.

11. A process according to claim 4, wherein:

the steel substrate in operation (I) has been cleaned with an alkaline cleaner before being brought into contact with the liquid treatment composition;

the substrate remains in contact with the liquid treating composition for at least 20 seconds during operation (I);

at the beginning of operation (II), the liquid treating composition is allowed to drain under the influence of natural gravity for from 5 to 15 seconds before the substrate is heated;

said minimum heat treating temperature in operation (II) is from about 180 to about 235° C.; and said heat treating interval of time is from about 11 to about 25 minutes.

12. A process according to claim 3, wherein:

the substrate remains in contact with the liquid treating composition for at least 15 seconds during operation (I);

at the beginning of operation (II), the liquid treating composition is allowed to drain under the influence of natural gravity for from 2 to 45 seconds before the substrate is heated;

said minimum heat treating temperature in operation (II) is from about 170 to about 245° C.; and said heat treating interval of time is from about 7 to about 30 minutes.

13. A process according to claim 2, wherein:

the substrate remains in contact with the liquid treating composition for at least 8 seconds during operation (I);

at the beginning of operation (II), the liquid treating composition is allowed to drain under the influence of natural gravity for from 2 to 45 seconds before the substrate is heated;

said minimum heat treating temperature in operation (II) is from about 150 to about 245° C.; and said heat treating interval of time is at least about 5 minutes.

14. A process according to claim 1, wherein:

the substrate remains in contact with the liquid treating composition for at least 8 seconds during operation (I);

at the beginning of operation (II), the liquid treating composition is allowed to drain under the influence of natural gravity for from 2 to 45 seconds before the substrate is heated;

said minimum heat treating temperature in operation (II) is from about 150 to about 245° C.; and said heat treating interval of time is at least about 5 minutes.

15. A concentrate useful for preparing a working liquid treatment composition for use in operation (I) of a process according to claim 1, said concentrate comprising the following components:

(A) a component selected from the group consisting of alkali metal silicates, this component being soluble in or dissolved in water; and (B) at least one of:

a mass of salts of partial esters of phosphoric acid that has a ratio to the mass of the component described in part (A) hereof, measured as its stoichiometric equivalent as sodium metasilicate pentahydrate, that is from about 0.004:1.0 to about 0.016:1.00; and a mass of ethoxylated fatty alcohols, said mass of ethoxylated fatty alcohols having a ratio to the mass, measured as its stoichiometric equivalent as sodium metasilicate pentahydrate, of the component described in part (A) hereof in the same concentrate that is from about 0.01:1.00 to about 0.04:1.00.

16. A concentrate according to claim 15 that is a solid concentrate and comprises at least 0.9% of ethoxylated fatty alcohol molecules as its surfactant component.

17. A concentrate according to claim 16 that consists essentially of at least about 1.7% of ethoxylated fatty alcohols and a balance of sodium metasilicate pentahydrate.

18. A concentrate according to claim 15 that is a liquid concentrate and comprises water and:

at least about 12 percent of dissolved alkali metal silicate; and at least about 0.5 percent of alkali metal salts of partial esters of phosphoric acid with fatty alcohols.

19. A concentrate according to claim 18 that comprises at least about 20% of dissolved alkali metal silicate and at least about 0.07 percent of alkali metal salts of partial esters of phosphoric acid with fatty alcohols.

20. A concentrate according to claim 19, wherein the dissolved alkali metal silicate before it was dissolved was sodium metasilicate pentahydrate.

* * * * *